United States Patent
Farahati et al.

(10) Patent No.: US 12,038,057 B2
(45) Date of Patent: Jul. 16, 2024

(54) WET FRICTION MATERIAL WITH COATED FILLER PARTICLES

(71) Applicant: Schaeffler Technologies AG & Co. KG, Herzogenaurach (DE)

(72) Inventors: Rashid Farahati, Copley, OH (US); Zhiru Shi, Wooster, OH (US); Murat Bakan, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1336 days.

(21) Appl. No.: 16/166,352

(22) Filed: Oct. 22, 2018

(65) Prior Publication Data

US 2020/0124126 A1 Apr. 23, 2020

(51) Int. Cl.
F16D 69/02 (2006.01)
F16D 25/062 (2006.01)
F16D 37/00 (2006.01)
F16D 69/00 (2006.01)

(52) U.S. Cl.
CPC ......... *F16D 69/026* (2013.01); *F16D 25/062* (2013.01); *F16D 37/00* (2013.01); *F16D 2069/008* (2013.01); *F16D 2200/0052* (2013.01); *F16D 2200/0069* (2013.01); *F16D 2200/0091* (2013.01)

(58) Field of Classification Search
None
See application file for complete search history.

(56) References Cited

U.S. PATENT DOCUMENTS

| 6,182,804 | B1 | 2/2001 | Lam |
| 6,316,083 | B1* | 11/2001 | Kawabata ................ B32B 7/02 |
| | | | 428/212 |
| 2004/0081813 | A1 | 4/2004 | Dong |
| 2005/0075413 | A1 | 4/2005 | Lam |
| 2005/0075414 | A1 | 4/2005 | Lam et al. |
| 2006/0009541 | A1 | 1/2006 | Chen et al. |
| 2007/0298211 | A1 | 12/2007 | Komori et al. |
| 2017/0130793 | A1 | 5/2017 | Bakan et al. |
| 2017/0204953 | A1* | 7/2017 | Farahati ................ F16D 69/026 |

FOREIGN PATENT DOCUMENTS

| CN | 1718672 A | 1/2006 |
| CN | 107326721 A | 11/2017 |
| CN | 108350966 A | 7/2018 |
| JP | 07018091 A | 1/1995 |
| JP | H07-018092 A | 1/1995 |

(Continued)

OTHER PUBLICATIONS

Corresponding Search Report for PCT/US2019/055645.

*Primary Examiner* — Marla D McConnell
*Assistant Examiner* — Kevin Worrell
(74) *Attorney, Agent, or Firm* — Davidson, Davidson & Kappel, LLC

(57) ABSTRACT

A method of making a wet friction material layer includes adding a media in liquid form to a material base including filler particles embedded in a matrix of fibers; drying the media to solidify the media on the filler particles such that the media plugs holes in the filler particles; adding a binder to the material base; and unplugging at least some of the holes in the filler particles by removing at least some of the media from the material base.

17 Claims, 4 Drawing Sheets

(56) References Cited

FOREIGN PATENT DOCUMENTS

| | | |
|---|---|---|
| JP | H08188656 A | 7/1996 |
| JP | H08-270695 A | 10/1996 |
| JP | 10120799 A | 5/1998 |
| JP | 2009062514 A | 3/2009 |
| JP | 2014077039 A | 5/2014 |
| WO | WO2017/123735 A1 | 7/2017 |
| WO | WO2018093353 A1 | 5/2018 |

* cited by examiner

Comparison of friction of coefficient vs. sliding speed at 120° C temperature, 3 MPa surface pressure and pre break-in.

WET FRICTION MATERIAL WITH COATED FILLER PARTICLES

The present disclosure relates generally to friction clutches and plates used in torque converters and motor vehicle transmissions and more specifically to wet friction material.

BACKGROUND

The friction material in wet-type friction clutches generally operates in an oil submerged environment and is often paper-based material used to form friction material rings. It is known to spray or sprinkle diatomaceous earth sold under the trade name CELITE on top of the base materials directly during the paper making process in a Fourdrinier machine at the wet end of the machine when the paper base material is being moved along a conveyor.

SUMMARY OF THE INVENTION

A method of making a wet friction material is provided. The method includes adding a media in liquid form to a material base including filler particles embedded in a matrix of fibers; drying the media to solidify the media on the filler particles such that the media plugs holes in the filler particles; adding a binder to the material base; and unplugging at least some of the holes in the filler particles by removing at least some of the media from the material base.

In some embodiments of the method, the media may be an emulsion. The emulsion may be latex. The latex may be an acrylic emulsion. The filler particles may be diatomaceous earth particles. The binder may be phenolic resin. The media may be added to the material base in liquid form during a pulping process for forming the material base. The removing of at least some of the media from the material base may include burning the media. The burning of the media may be performed by heat that cures the binder. The heat that cures the binder may be provided by a heat plate that is pressed against an outer surface of the wet friction material layer. The removing of at least some of the media from the material base may form voids in the wet friction material layer along the filler particles. The media may form 3 to 6% by percentage weight of the wet friction material layer before the removing at least some of the media from the material base.

A method of making a part of a friction clutch is also provided that includes making the wet friction material. The removing of at least some of the media from the material base may include burning the media by heat that cures the binder to fix the wet friction material to a metal part of the friction clutch.

A wet friction material is also provided that includes a base material including a matrix of fibers and filler particles embedded in the matrix of fibers. The filler particles each include a plurality of holes. The wet friction material also includes a binder embedded in the base material, at least some of the holes in the filler particles being unplugged.

In some embodiments of the wet friction material, the wet friction material includes remnants of a media. The media may be latex. The remnants may include carbonized residue. The latex may be an acrylic emulsion. The filler particles may be diatomaceous earth particles. The binder may be phenolic resin.

A clutch assembly is also provided that includes a metal part and the wet friction material fixed on the metal part.

BRIEF DESCRIPTION OF THE DRAWINGS

The present disclosure is described below by reference to the following drawings, in which.

DETAILED DESCRIPTION

Figure 1A:
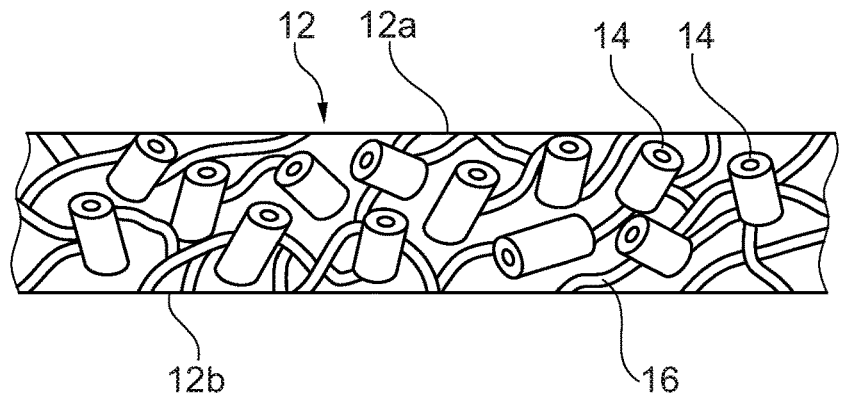
FIG. 1a schematically shows a wet friction material layer before the binder is added.

The present disclosure provides a method that includes saturating diatomaceous earth particles with a temporary media, in the form of a liquid, before friction material is saturated with phenolic resin to prevent plugging of diatomaceous earth particles with phenolic resin. By preventing the plugging of diatomaceous earth particles with phenolic resin, the porosity of the friction material is increased, providing an improved frictional material that can absorb oil quickly between reaction plate and the wet friction material layer during clutch engagements.

The impregnating of the wet friction material with phenolic resin is performed in order to be durable in high temperature and high pressure in vehicle application. Since phenolic resin is carried through a liquid media and during wet friction material saturation the phenolic resin penetrates inside diatomaceous earth particles and then hardens during the curing process, making diatomaceous earth particles harder and less porous.

The present disclosure provides a method of forming wet friction material that includes adding latex liquid in wet friction material (raw paper) pulping process and so the latex plugs diatomaceous earth particles. The latex liquid is an emulsion system that is capable of gel formation/solidification/hardening). Latex dries during the paper drying stage and shapes a thin rubbery barrier around diatomaceous earth that prevents phenolic resin from penetrating into holes in diatomaceous earth particles. In contrast to the phenolic resin, the latex is not hardened during the phenolic resin curing process. Latex on the wet friction material surface is removed, by the latex wearing off or being burnt off during wet friction material bonding to steel plates, and the remaining resin on surface rubs off during clutch engagement during use, to help keep DE particle pores open and fresh. It may be particularly advantageous to add latex up to a specific percentage to improve the performance of wet friction material, as no improvement is seen above such a specific percentage.

The latex used may also help cause the stronger binding of diatomaceous earth particles to the network of fibers so that during the application of the clutch, the diatomaceous earth particles become more effective and provide better friction characteristics.

FIGS. 1a to 1d and FIG. 2 schematically illustrate a method of forming a wet friction material layer and a clutch assembly in accordance with an embodiment of the present disclosure.

A wet friction material layer 12 may be formed of fibers, filler material, a binder and a media. The fibers can be aramid fibers, organic fibers, carbon fibers and/or fiberglass. The organic fibers may include cellulose fibers or cotton fibers. The filler material may be particles of diatomaceous earth. The binder may be a phenolic resin. The media may be an emulsion in the form of latex. Optionally a friction modifier such as graphite may also be included in wet friction material layer 12. The fibers of layer 12 may have a mean diameter of 45 to 55 microns and a mean length of 1 to 2 millimeters.

In one preferred embodiment, wet friction material layer 12 may include, by percentage weight, 25 to 40% fibers, 30 to 40% filler material and 25 to 40% binder. More specifically, wet friction material layer 12 may include, by percentage weight, 30 to 35% fibers, 30 to 35% filler material and 30 to 35% binder.

FIG. 1a schematically shows wet friction material layer 12 before the binder is added. Wet friction material layer 12 includes a material base formed by a plurality of diatomaceous earth particles 14 imbedded in a matrix of fibers 16 between a first outer surface 12a and a second outer surface 12b of wet friction material layer 12.

Figure 1B:
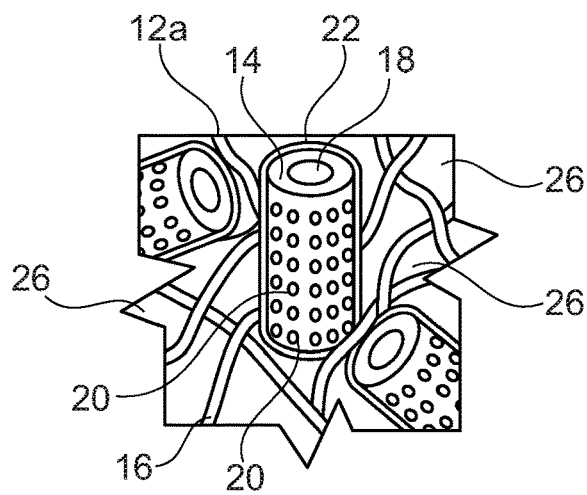
FIG. 1b shows an enlarged view of a section of wet friction material layer shown in FIG. 1a illustrating fibers and diatomaceous earth particles coated with a media in the form of latex.

FIG. 1b shows an enlarged view of wet friction material layer 12 illustrating a section of wet friction material layer 12 including fibers 16 and diatomaceous earth particles 14 coated with latex 22. In the embodiment shown in FIG. 1b, diatomaceous earth particles 14 have a hollow cylindrical shape and each includes a hole 18 passing axially therethrough. Particles 14 are also porous and include a plurality of holes 20 passing radially therethrough from an inner circumferential surface to an outer circumferential surface of the respective particle 14. In other embodiments, particles 14 may have a different shape, but still include a plurality of holes and are porous. As shown in FIG. 1b, each of diatomaceous earth particles 14 is covered in latex 22 such that holes 18, 20 are plugged by the latex 22.

Latex 22 may be added as a 3 to 6% add-on to the raw material (in weight %, referring to the solid latex in the liquid in comparison to the weight of the other solid material) during the formation of wet friction material layer 12 during the pulping process as a water-based liquid along with a base liquid, in which fibers 16 and diatomaceous earth particles 14 are submerged. After being formed into sheets during the pulping process, the wet friction material layer 12 may be then dried at for example at 300° F. to remove the base liquid, causing latex 22 to dry and solidify to cover the diatomaceous earth particles 14, plugging holes 18, 20 and creating a thin rubbery barrier around each of the diatomaceous earth particles 14 to penetrate holes 18, 20.

Figure 1C:
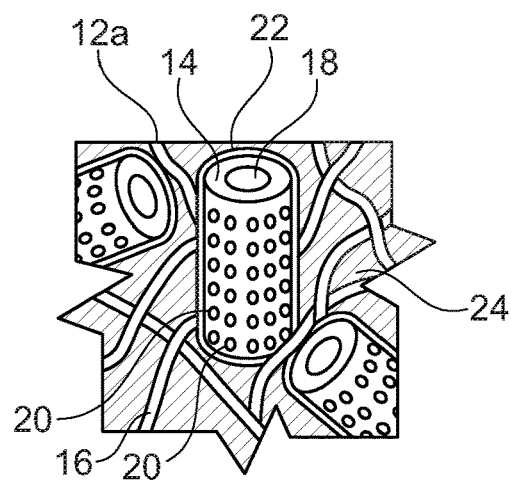
FIG. 1c shows the wet friction material layer after a binder is added to the wet friction material layer.

As shown in FIG. 1c, after latex 22 is solidified in wet friction material layer 12 inside of holes 18, 20 of diatomaceous earth particles 14, the binder 24 is added to wet friction material layer 12 such that voids 26 (FIG. 1b) in wet friction material layer 12 between a matrix formed by fibers 16 and diatomaceous earth particles 14 are saturated with the binder. The coating of diatomaceous earth particles 14 with solidified latex 22 prevents or minimizes the penetration of the binder into holes 18, 20 in diatomaceous earth particles 14.

Figure 2:
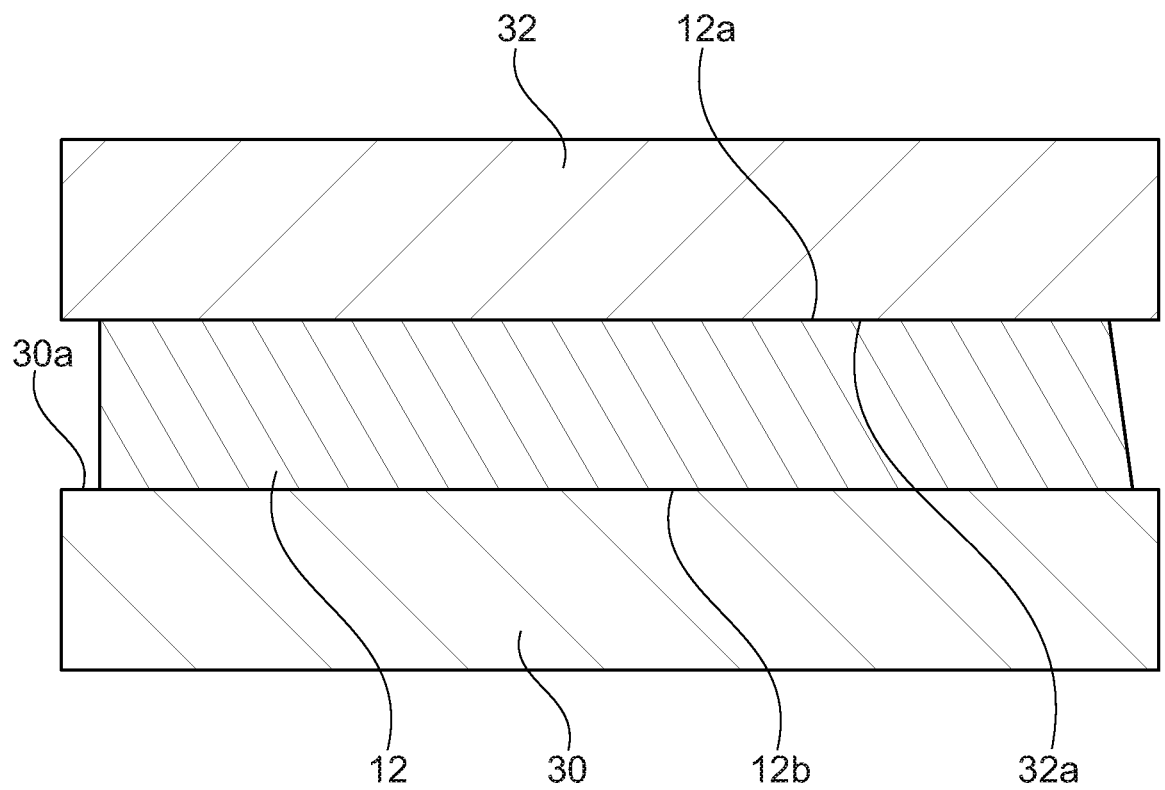
FIG. 2 shows the wet friction material layer being joined on top of a metal part via a heat plate.

As shown in FIG. 2, wet friction material layer 12 is then placed on top of a metal part 30 and layer 12 and part 30 are joined together to form a friction assembly. Prior to joining of layer and part 30, the binder is subject to initial curing to a level called B-stage, where the layer 12 is somewhat flexible. The joining of layer 12 and part 30 together includes pressing wet friction material layer 12 against metal part 30 with a heat plate 32 to complete curing of the binder 24 in wet friction material layer 12, fixing wet friction material layer 12 and metal part 30 together. The force of pressing of heat plate 32 against outer surface 12a of wet friction material layer 12, while inner surface 12b of wet friction material layer 12 rests on an outer layer 30a of metal part 30, causes the binder to accumulate at an interface of inner surface 12b of wet friction material layer 12 and outer surface 30a of metal part 30, while the curing of the binder by the heat of heat plate 32 creates a permanent connection between metal part 30 and wet friction material layer 12. Binder 24 shown in FIG. 1c solidifies and hardens in wet friction material layer 12 in contact with solidified latex 22 and fibers 16. In one preferred embodiment, the heat at a surface 32a of plate 32 that contacts outer surface 12a of outer layer is 375 to 425 degrees F.

Figure 1D:
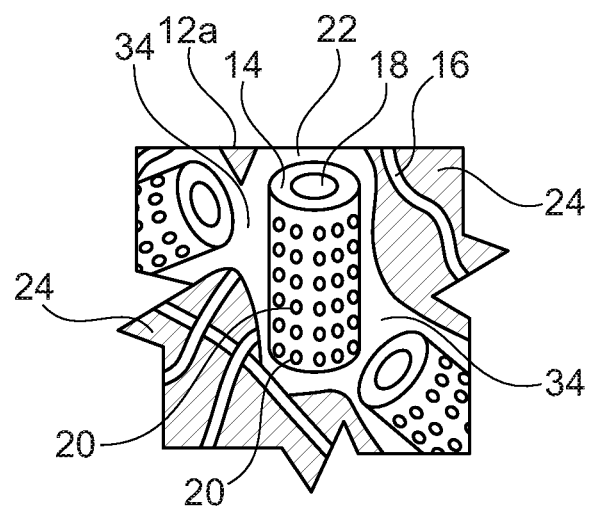
FIG. 1d shows the wet friction material after the latex is removed from the diatomaceous earth particles.

The heat from heat plate 32 unplugs at least some of the holes 18, 20 in particles 14 by removing at least some of the latex by burning off the latex 22 surrounding diatomaceous earth particles 14 and unclogs holes 18, 20 in particles 14. In some embodiments, at least 50% of the holes (by number or volume) are unplugged, for example, at least 75% or at least 90%. As shown in FIG. 1d, the burning of the latex 22 creates voids 34 in regions occupied by the latex 22 before the burning of the latex 22. Voids 34 allow fluid to flow from outer surface 12a through wet friction material layer 12 to inner surface 12b along diatomaceous earth particles 14, allowing particles 14 to absorb fluid via holes 18, 20. Remnants of latex in the form of carbonized residue due to thermal degradation may be present after the burning of the latex.

Any latex 22 that possibly remains under surface 12a after the application of heat plate 32 rubs away during clutch engagement of wet friction material layer 12 with a further clutch part and keep particles 14 unclogged.

It is advantageous to add 3 to 6% of latex as an add on (wt % in reference to the solid weight of the latex solution) with respect to raw friction material weight to improve the performance of the layer 12, but adding latex in amounts above 6% does not appear to further help performance. In some embodiments, latex may added as an add on below 3% wt or greater than 6% wt.

Latex is in the form of butadiene acrylonitrile copolymer improves performance of layer 12 to a certain degree, but latexes in the form of acrylic emulsions have a more dominant effect on the performance of layer 12.

Figure 3:
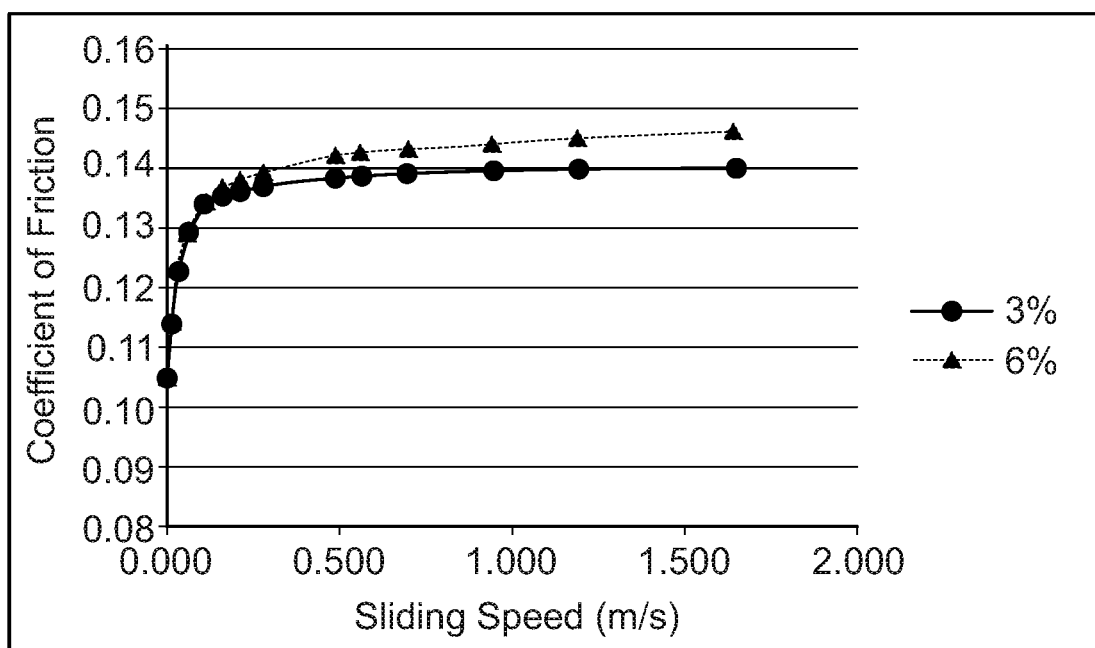
FIG. 3 shows a friction versus speed graph illustrating the effect of higher acrylic based latex on the material.

FIG. 3 shows a friction versus speed graph illustrating the effect of higher acrylic based latex on the material. As noted above, the percentage of latex is an add on (wt %) with respect to raw friction material weight, considering the solid weight of the latex solution for the percentage.

Figure 4:
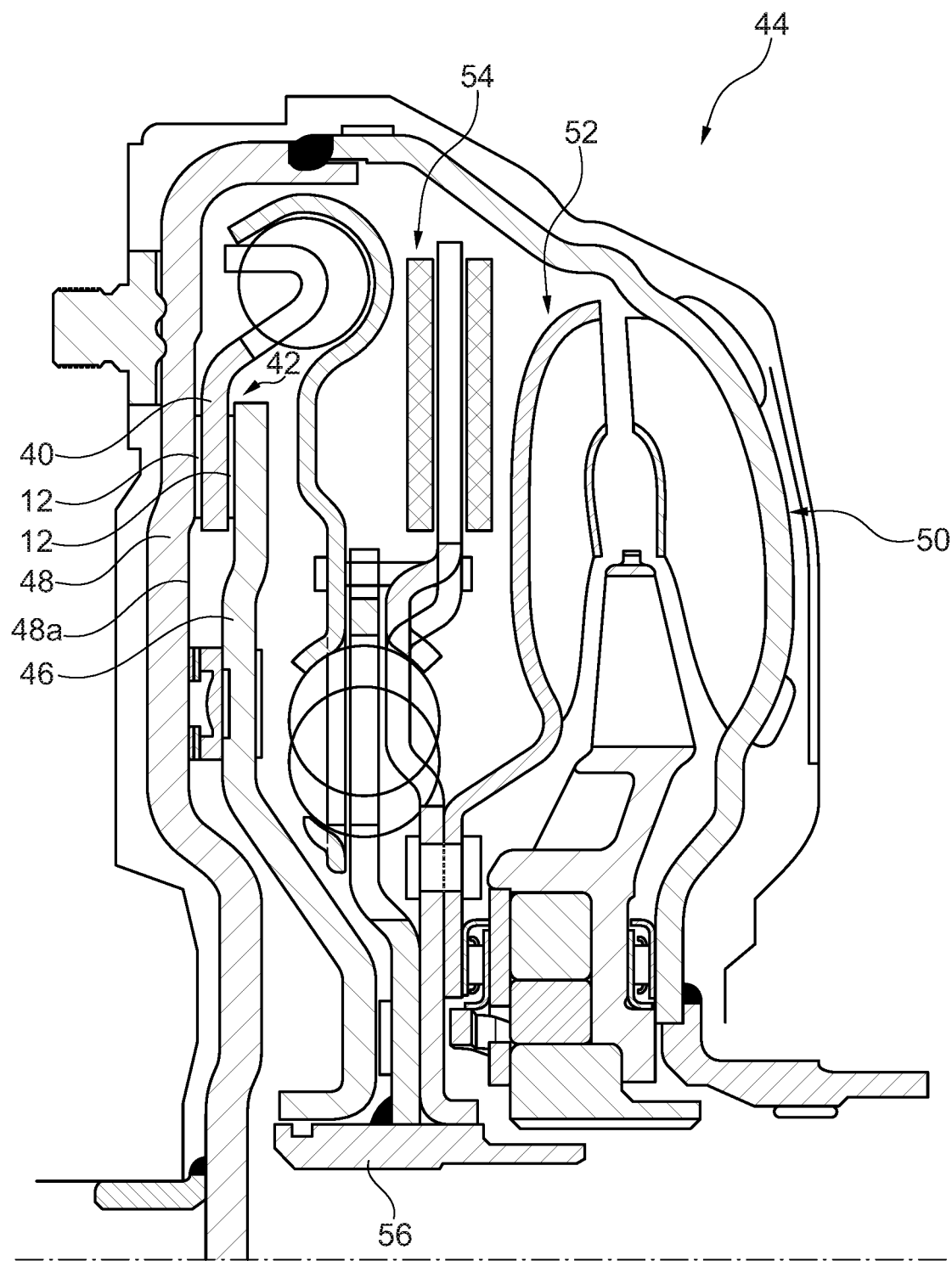
FIG. 4 shows a wet friction material layer bonded to both sides of a clutch plate of lockup clutch assembly of a torque converter.

FIG. 4 shows wet friction material layer 12 bonded to both sides of a metal part in the form of a clutch plate 40 of lockup clutch assembly 42 of a torque converter 44. A piston 46 of lockup clutch assembly 42 forces clutch plate 40 against an inside surface 48a of a front cover 48 of torque converter 44. Piston 46 contacts the surface 12a of the rear piece of wet friction material 42 to force the surface 12a on the front piece of wet friction material layer 12 against inside surface 48a of front cover 48. The forcing of clutch plate 40 against front cover 48 by piston 46 locks the lockup clutch assembly 42 such that a torque path in torque converter 44 to a transmission input shaft bypasses an impeller 50 and a turbine 52 of torque converter 44, and instead flows from front cover 48 to clutch plate 40 and through a damper assembly 54 to a transmission input shaft that is connected to an output hub 56 of torque converter 44.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 12 wet friction material layer
12a outer surface
12b inner surface
14 diatomaceous earth particles
16 fibers
18 axially extending hole
20 radially extending holes
22 latex
24 binder
26 voids
30 metal part
30a outer surface
24 heat plate
32a surface
34 voids
40 clutch plate
42 lockup clutch assembly
44 torque converter
46 piston
438 front cover
48a inside surface
50 impeller
52 turbine
54 damper assembly
56 output hub

What is claimed is:

1. A method of making a wet friction material layer comprising:
    adding a media in liquid form to a material base including filler particles embedded in a matrix of fibers;
    drying the media to solidify the media on the filler particles such that the media plugs holes in the filler particles;
    adding a binder to the material base after the dried media plugs holes in the filler particles; and
    unplugging at least some of the holes in the filler particles by removing at least some of the media from the material base after the binder is added to the material base.

2. The method as recited in claim 1 wherein the media in liquid form is an emulsion.

3. The method as recited in claim 2 wherein the emulsion is latex.

4. The method as recited in claim 3 wherein the latex is an acrylic emulsion.

5. The method as recited in claim 1 wherein the filler particles are diatomaceous earth particles.

6. The method as recited in claim 1 wherein the binder is phenolic resin.

7. The method as recited in claim 1 wherein the media is added to the material base in liquid form during a pulping process for forming the material base.

8. The method as recited in claim 1 wherein the removing of at least some of the media from the material base includes burning the media.

9. The method as recited in claim 8 wherein the burning of the media is performed by heat that cures the binder.

10. The method as recited in claim 9 wherein the heat that cures the binder is provided by a heat plate that is pressed against an outer surface of the wet friction material layer.

11. The method as recited in claim 1 wherein the removing of at least some of the media from the material base forms voids in the wet friction material layer along the filler particles.

12. The method as recited in claim 1 wherein the media forms 3 to 6% by percentage weight of the wet friction material layer before the removing at least some of the media from the material base.

13. A method of making a part of a friction clutch comprising:
    making the wet friction material with the method as recited in claim 1,
    the removing of at least some of the media from the material base includes burning the media by heat that cures the binder to fix the wet friction material to a metal part of the friction clutch.

14. The method as recited in claim 1 wherein after the unplugging step, the wet friction material layer includes, by percentage weight, 25 to 40% fibers, 30 to 40% filler material and 25 to 40% binder.

15. The method as recited in claim 1 wherein during the unplugging step, at least 50% of the holes in the filler particles are unplugged.

16. The method as recited in claim 1 wherein during the unplugging step, at least 75% of the holes in the filler particles are unplugged.

17. The method as recited in claim 1 wherein during the unplugging step, at least 90% of the holes in the filler particles are unplugged.

* * * * *